United States Patent
Fitzgerald et al.

(10) Patent No.: US 7,802,084 B2
(45) Date of Patent: Sep. 21, 2010

(54) SYSTEM AND METHOD FOR MANAGEMENT AND INSTALLATION OF OPERATING SYSTEM IMAGES FOR COMPUTERS

(75) Inventors: Joseph J. Fitzgerald, Franklin Lakes, NJ (US); Edward Kahn, Sarasota, FL (US); Phillip Burgard, Kinnelon, NJ (US); Harry Moeller, Gruenwald (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 573 days.

(21) Appl. No.: 10/578,091

(22) PCT Filed: Nov. 24, 2004

(86) PCT No.: PCT/US2004/039658
§ 371 (c)(1), (2), (4) Date: Aug. 13, 2007

(87) PCT Pub. No.: WO2005/055072
PCT Pub. Date: Jun. 16, 2005

(65) Prior Publication Data
US 2008/0046708 A1 Feb. 21, 2008

Related U.S. Application Data

(60) Provisional application No. 60/525,278, filed on Nov. 26, 2003.

(51) Int. Cl.
*G06F 9/00* (2006.01)
*G06F 9/24* (2006.01)
*G06F 15/177* (2006.01)

(52) U.S. Cl. .................. 713/2; 713/1; 709/222

(58) Field of Classification Search ........... 713/1, 713/2
See application file for complete search history.

(56) References Cited

U.S. PATENT DOCUMENTS

| | | | |
|---|---|---|---|
| 5,109,484 A * | 4/1992 | Hughes et al. ............ 709/222 |
| 5,280,627 A * | 1/1994 | Flaherty et al. .............. 713/2 |
| 5,948,101 A * | 9/1999 | David et al. .................. 713/2 |
| 6,334,149 B1 | 12/2001 | Davis, Jr. et al. |
| 6,421,777 B1 * | 7/2002 | Pierre-Louis et al. ......... 713/2 |
| 6,539,473 B1 * | 3/2003 | Hubacher et al. ............. 713/2 |
| 6,681,323 B1 * | 1/2004 | Fontanesi et al. ............ 713/1 |
| 6,751,658 B1 * | 6/2004 | Haun et al. ................ 709/222 |
| 6,993,642 B2 * | 1/2006 | Burkhardt et al. ............ 713/1 |
| 7,069,428 B2 * | 6/2006 | Miyamoto et al. ............ 713/1 |
| 7,085,921 B2 * | 8/2006 | Frye, Jr. ...................... 713/1 |
| 7,089,300 B1 * | 8/2006 | Birse et al. ................. 709/221 |
| 7,251,725 B2 * | 7/2007 | Loison et al. ................. 713/1 |
| 2002/0073303 A1 | 6/2002 | French et al. |
| 2003/0005276 A1 | 1/2003 | French et al. |

* cited by examiner

Primary Examiner—Suresh K Suryawanshi

(57) ABSTRACT

Shown is a method and system for provisioning a target computer with an operating system, which calls for booting the target computer in a pre-operating system environment, collecting configuration information for the target computer, and transmitting the configuration information to a predetermined server. The approach shown also provides for searching a database in the server for a pre-existing operating system image corresponding to the configuration information from the target computer. If a corresponding operating system image is found, then the present approach involves transferring the pre-existing operating system image to the target computer and installing the pre-existing operating system image on the target computer.

17 Claims, 9 Drawing Sheets

SYSTEM AND METHOD FOR MANAGEMENT AND INSTALLATION OF OPERATING SYSTEM IMAGES FOR COMPUTERS

CROSS-REFERENCE TO RELATED PATENT APPLICATIONS

This application claims the benefit of U.S. Patent Application No. 60/525,278 filed Nov. 26, 2003, herein incorporated by reference in its entirety for all purposes.

1. TECHNICAL FIELD

The present invention is directed toward management of operating system software on computing devices.

2. BACKGROUND

Many enterprises face the problem of how to provision a large number of information systems devices with an operating system. Currently, there are two basic approaches to the problem: (1) creation and installation of a software image for the devices, and (2) use of a scripted installation utility to build an image for each device.

The first approach involves creation of a software image that is copied to each device. This approach is often favored by large enterprises with a large number of devices because it is typically easy and fast to copy an image across a network connection to each device. However, there must be an exact match between the software image and the configuration of the device or the image will be incorrect and likely inadequate for operation of the device. Use of this approach typically requires a high degree of control over the hardware configuration of the target devices. This is difficult to achieve because often even systems of the same model provided by a single manufacturer may have subtle differences, e.g. different model of network interface card requiring different input/output driver software. Often, the image is downloaded and additional administration and maintenance is required to fix the exceptions and fine tune the downloaded image for the particular device.

The second approach involves the execution of an install script on the target device. This install script may require user input to define the configuration of the target device. Alternatively, the install script may search the target device and automatically discover the configuration of the target device. In both cases, the result is an image that is an exact match for the target device. However, execution of the install script may be either time or labor intensive or both, particularly on a large scale

SUMMARY OF THE INVENTION

An embodiment of a method for provisioning a target computer with an operating system, calls for booting the target computer in a pre-operating system environment, collecting configuration information for the target computer, and transmitting the configuration information to a predetermined server. The method also provides for searching a database in the server for a pre-existing operating system image corresponding to the configuration information from the target computer. If a corresponding operating system image is found, then the method sets forth transferring the pre-existing operating system image to the target computer and installing the pre-existing operating system image on the target computer.

BRIEF DESCRIPTION OF THE DRAWINGS

Certain embodiments will now be described with reference to the following drawings wherein.

DETAILED DESCRIPTION

Figure 1:
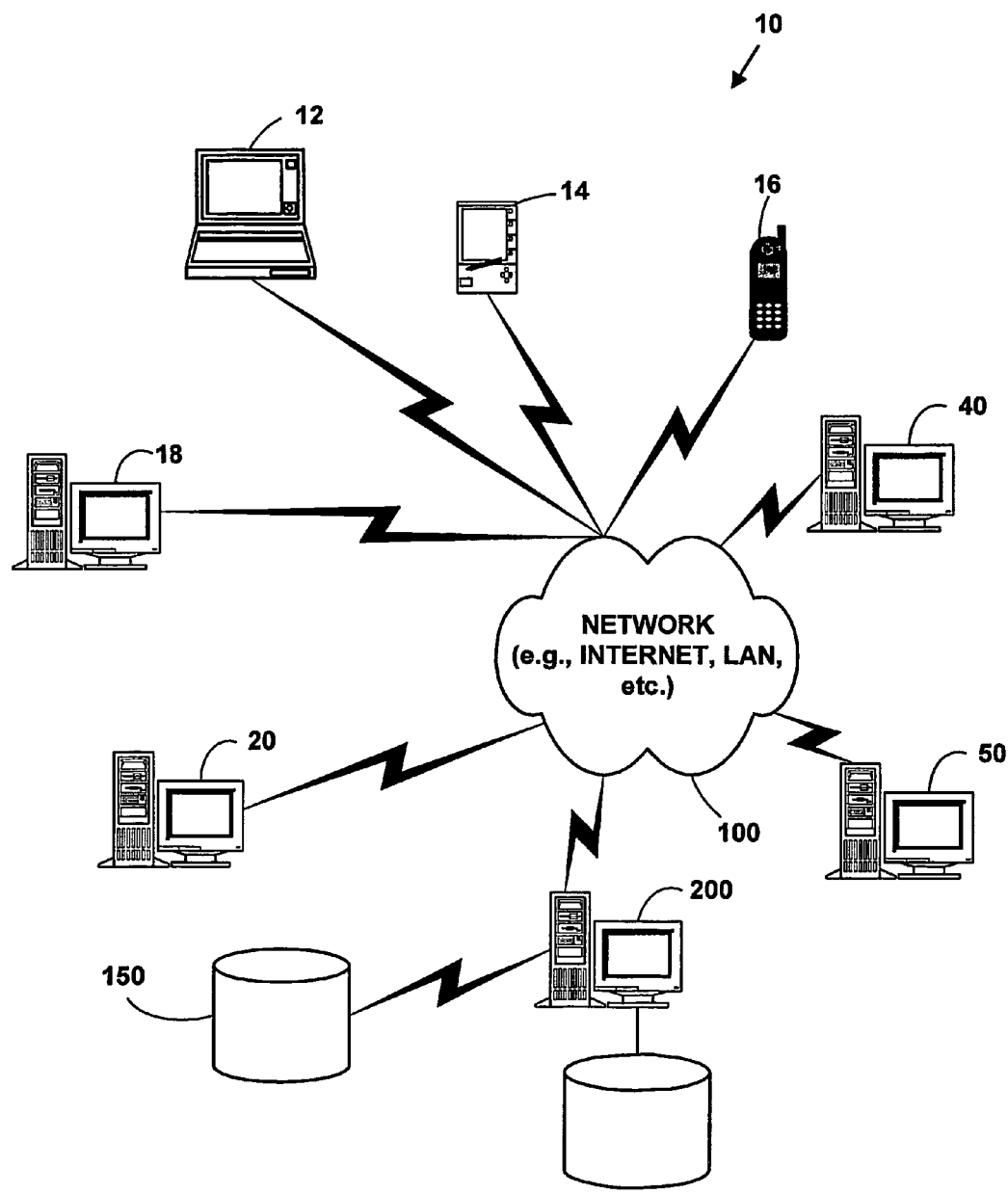
FIG. 1 is a block diagram illustrating an exemplary embodiment of an operating system deployment system.

Embodiments of a system and method are described for automatically provisioning a target computer with an operating system. In one embodiment, the target computer is provided with an operating system image that corresponds to certain characteristics of the target computer. In another embodiment, an operating system image is identified as prescribed through policy information and the target computer checks whether an existing operating system matches the prescribed operating system. In still another embodiment, when no operating system image exists in the system, an operating system may be constructed on the target computer and an image of the operating system uploaded and stored for use in provisioning other target computers with similar characteristics.

In one embodiment, a client agent is downloaded to the target device in order to perform an inventory of the target device to determine its hardware configuration. The inventory of the hardware configuration of the target device is sent to a server device. The server device searches a database of images for an image that matches the hardware configuration of the target device. If a matching image is found, then it is downloaded to the target device. If no matching image is found in the database, then a message is sent to the client agent, which proceeds to perform a native install process to construct an image for the target device. Once the native install process is completed, the constructed image is uploaded to the server device for storage in the database of images. Alternatively, the server device constructs an image for the target device based on the inventory of the hardware configuration sent by the client agent. The constructed image is downloaded to the target device and stored in the database of images. The server device may construct the image based upon policy data corresponding to the target device.

One embodiment of a method calls for booting the target computer in a pre-operating system environment, collecting configuration information for the target computer, and transmitting the configuration information to a predetermined server. The method also provides for searching a database in the server for a pre-existing operating system image corresponding to the configuration information from the target computer. If a corresponding operating system image is found, then the method sets forth transferring the pre-existing operating system image to the target computer and installing the pre-existing operating system image on the target computer. A further refinement of this method provides for constructing an operating system image for the target computer using the configuration information if no corresponding pre-existing operating system image is found, transferring the constructed operating system image to the target computer, and installing the constructed operating system image on the target computer. This refinement further provides for storing the constructed operating system image and the configuration data in the database in the server. Yet another refinement of this embodiment provides for, if no corresponding pre-existing operating system image is found, running an install script on the target computer to construct an operating system for the target computer. This refinement further recites imaging the operating system constructed on the target computer, uploading the constructed operating system image from the target computer to the predetermined server, and storing the constructed operating system image and the configuration data in the database in the server.

An embodiment of a system for provisioning an operating system on target computers over a network includes at least one target computer configured to respond to initialization by requesting a network address for communication over the network, respond to receiving the network address by requesting a boot file over the network, respond to receiving the boot file by executing the boot file in a pre-operating system environment to create a client agent, where the client agent is configured to perform an inventory of the target computer to collect configuration data and transmit the configuration data in a request for an operating system image to a predetermined server, the client agent being further configured to receive an operating system image and, responsive thereto, install the operating system image on the target computer and execute the operating system. The system also includes a network address server configured to monitor the network for the request for a network address and, responsive thereto, allocate the network address for communication over the network and return it to the requesting device, as well as a boot server configured to monitor the network for the request for the boot file and, responsive thereto, transmit the boot file to the requester. An operating system management server of the system is configured to monitor the network for the request for an operating system image, receive the request along with the configuration data, use the configuration data to search for a corresponding operating system image and, if the corresponding operating system image is found, transmit the corresponding operating system image to the target computer. In a further refinement of this embodiment, the operating system management server is further configured to transmit a failure message to the target computer when no corresponding operating system image is found. In addition, the client agent on the target computer is further configured to receive the failure message and, responsive thereto, execute an install script on the target computer to construct an operating system, image the operating system, and upload the operating system image to the operating system management server. Also, the operating system management server in this refinement is still further configured to receive the operating system image constructed on the target computer and store it along with the configuration data for the target computer. In another refinement of this embodiment, the operating system management server is further configured, when no corresponding operating system image is found, to construct an operating system image based on the configuration data from the target computer and transmit the constructed operating system image to the target computer.

Another embodiment of a method for determining an operating system for target computers over a network sets forth booting a target computer in a pre-operating system environment, collecting policy criteria data for the target computer, and transmitting the policy criteria data to an operating system management server. This embodiment also calls for providing policy data defining a relationship between specific policy criteria data instances and operating system image instances, resolving an appropriate operating system image for the target computer based on the policy criteria data from the target computer and the policy information, and transmitting to the target computer an operating system object identifier corresponding to the resolved operating system image. A refinement of this embodiment calls for receiving the operating system object identifier corresponding to the resolved operating system image in the target computer, requesting download of the operating system image file corresponding to the operating system object identifier, and installing the operating system image and executing the operating system responsive to receiving the operating system image file in the target computer. A different refinement of this embodiment calls for receiving the operating system object identifier corresponding to the resolved operating system image in the target computer and checking whether the operating system object identifier corresponds to an operating system currently installed on the target computer. If the operating system object identifier does not correspond to the operating system currently installed on the target computer, then this refinement sets forth requesting download of the operating system image file corresponding to the operating system object identifier, receiving the operating system image file in the target computer, installing the operating system image, and executing the operating system. If the operating system object identifier does correspond to the operating system currently installed on the target computer, this refinement calls for executing the operating system currently installed on the target computer.

In one embodiment, a pre-Operating System (pre-OS) environment client agent on a target computer is used to determine the characteristics of the target computer, e.g. the computer processor and bus characteristics. This information is sent to a server that maintains and manages OS images. Using the characteristic data provided by the client agent, the server determines whether it has stored an OS image that matches the characteristic data for the target computer. This process may also include consideration of policy data, such as what type of OS should be installed on target computers for a given company, e.g. Windows, McIntosh OS, or Linux. If the server has a matching OS image, this image is downloaded to the target computer and installed by the client agent. Note that it may be helpful that the Hardware Abstraction Layer of the target computer and the reference computer used to produce the OS image be the same version and have compatible programmable interrupt controller capabilities. Also note that multiple OS images may be applicable for a particular target computer, in which case the final selection of the OS image to be deployed may be determined by, for example, policy data or through user input.

If no matching OS image is found, then the server notifies the client agent, which responds by executing a native scripted install process. The scripted install process is invoked to install a suitable OS on the target machine. Once the suitable OS is installed on the target machine, the image may be captured from the target computer, e.g. read from storage on the target computer, and sent to the server for storage in the server's repository along with meta-data describing the characteristics of the target computer. In this way, the OS image for the target machine is captured for later installation on another target machine having the same or similar characteristics, as described above.

The client agent may be introduced to the target device in a variety of ways, including being downloaded over a network connection from the server by the pre-OS environment, being part of the pre-OS environment, or from portable storage or media. Note that if the client agent is totally memory resident then it will not become part of the OS image for the target computer.

FIG. 1 is a block diagram illustrating an exemplary embodiment of an operating system deployment system 10. Exemplary operating system deployment system 10 includes, but is not limited to, one or more target devices 12, 14, 16 and 20 (only four of which are illustrated). The target computers 12, 14, 16, 20 include, but are not limited to, personal computers, wireless devices, laptop computers, mobile phones, personal information devices, personal digital/data assistants (PDA), hand-held devices, network appliances, one and two-way pagers, and other types of electronic devices including servers, non-personal computers such as mainframe computers, minicomputers, etc., wherein the use of an operating system in the target device is typically useful. Further, another example of a target computer includes a blade computer, such as a single board computer residing in a rack configured to support multiple blade computer boards. Still other example of possible target computers include devices having embedded operating systems, such as set-top boxes, personal video recorders, or other computer devices that may be provisioned with an operating system, where the operating system typically resides in electrical storage media, such as flash memory. However, the present invention is not limited to these devices and more, fewer or others types of target electronic devices can also be used.

The target devices 12, 14, 16, 20 are capable of communication with a communications network 100 (e.g., the Internet, intranet, Public Switch Telephone Network (PSTN), Local Area Network, (LAN), Wide Area Network (WAN), etc., or combinations thereof). The communications includes, but is not limited to, communications over a wire connected to the target network devices, wireless communications, and other types of communications using one or more communications protocols.

In the exemplary embodiment of FIG. 1, multiple server devices 40, 50 and 200 are shown that are capable of communicating target devices 12, 14, 16, 20 via network 100. The server devices 40, 50, 200, include, but are not limited to, World Wide Web servers, Internet servers, file servers, patch servers, other types of electronic information servers, and other types of server network devices (e.g., edge servers, firewalls, routers, gateways, etc.). A network address management server 40, such as a Dynamic Host Configuration Protocol (DHCP) server, is provided in the example of FIG. 1 to allocate a network address to a target device requesting to be assigned a network address. The example of FIG. 1 also includes a boot server 50, which is configured to store at least one boot file to be provided to a requesting target device upon request. For example, the boot server may be a Windows based Pre-execution Environment (PXE) server and Trivial File Transfer Protocol (TFTP) server. In some implementations, it may be desirable that network address server 40 and boot server 50 not be the same device because, for example, a PXE server and a DHCP server monitor the same DHCP port. Also, PXE uses DHCP broadcast, multicast, or UDP protocols and receives broadcasts. Typically, this means that if broadcast traffic is restricted between subnets of the network 100, then it may be necessary to provide separate boot servers for each subnet, enable broadcasts, or use a DHCP helper function to pass DHCP broadcast traffic.

An operating system (OS) management server 200 is also provided in this example and is configured to store and serve at least one OS image to target computers. A policy store 150 is shown that may be embodied in yet another server or may be integrated into one of the servers shown. In addition, the functions of one or more of the servers shown may be combined into a single server device without departing from the teachings of the present invention. Examples of sources of policy information include Microsoft Active Directory, Novell NDS, Sun NIS, Sun-Netscape iPlanet, or LDAP or SQL compliant sources of information for policy based specification of operating system configurations.

Figure 2:
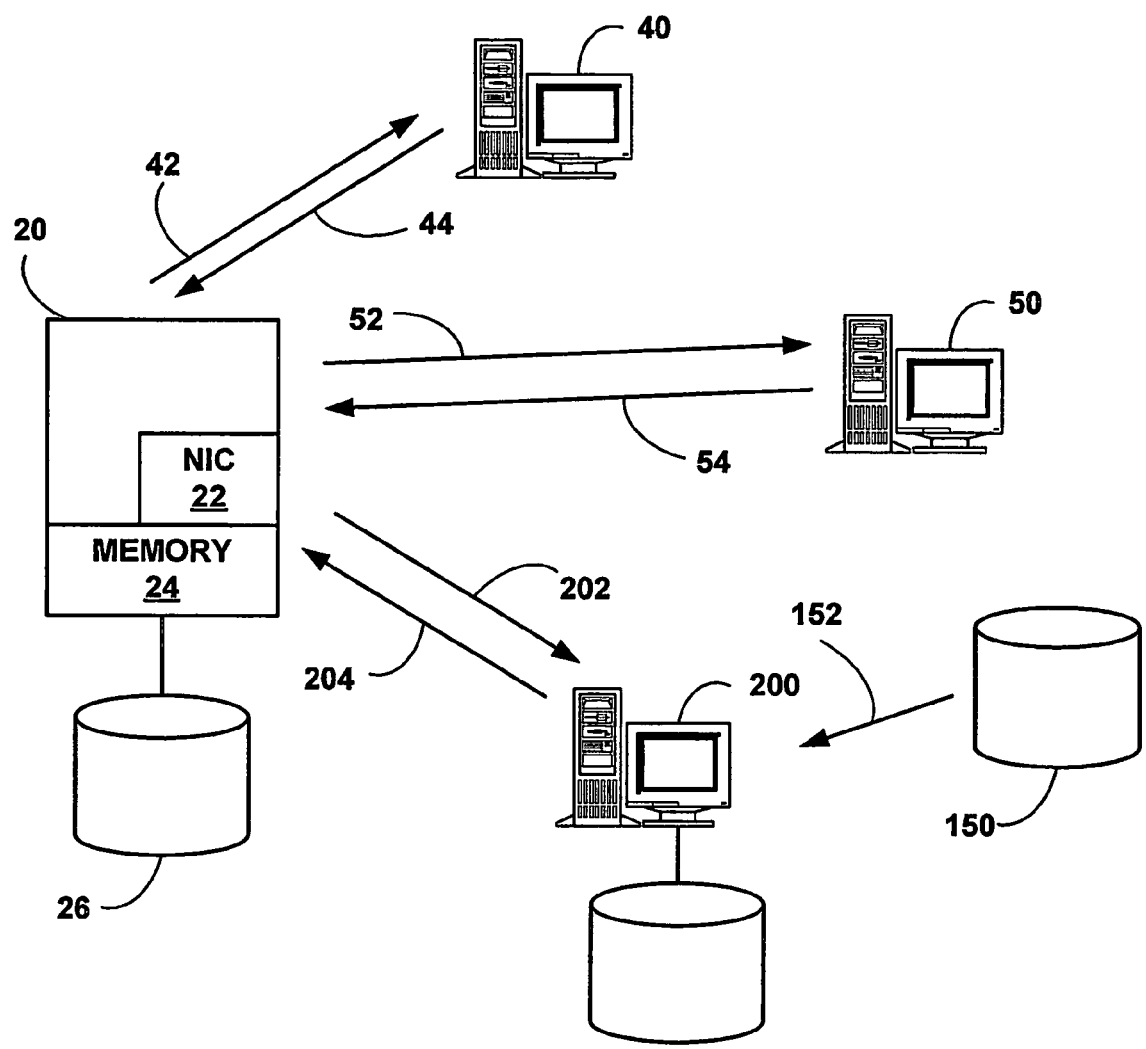
FIG. 2 is a functional block diagram illustrating an exchange of messages between a target computer and a series of servers in an exemplary embodiment of a system for provisioning an operating system on target computers over a network.

FIG. 2 is a functional block diagram illustrating an example of a scenario whereby target computer 20 of FIG. 1 is provisioned with an operating system. A pre-execution environment (e.g. PXE) agent is established in the target computer that collects configuration data pertaining to the target computer. This data is provided to an OS manager server that, in turn, searches for an OS image matching the data from the target computer. If a matching OS image is discovered, this OS image is transmitted to the target computer where it is installed and booted. For example, this approach may be utilized in provisioning a target computer that has no existing OS installed on it. This approach may also be used to update or replace an OS image on a target computer or to add an additional OS image for use in a virtual machine application. Note that if the client agent inventories a virtual machine, then the virtual layer on the target computer may provide data that is different from the actual characteristics of the host computer. In this case, the data will reflect the characteristics of the virtual machine, which is the target computer, rather than the characteristics of the physical computer. See "Virtual Machines & VMware, Part I", J. Munro, ExtremeTech, Dec. 21, 2001 and "Virtual Machines & VMware, Part II", J. Munro, ExtremeTech, Dec. 28, 2001 for an example and further details regarding virtual machine applications.

In the example scenario of FIG. 2, target computer 20 communicates with network 100 via a network interface card (NIC) 22 and includes a memory store 24 and disk storage 26. In this embodiment, NIC 22 includes network boot code stored, for example, as firmware on the NIC and the BIOS of the target computer is set to boot from the network. Thus, system boots from the network boot code on the NIC and the client agent on the target computer proceeds to transmit a request for assignment of a network address, such as an IP address, to a network address server, such as DHCP server 40. In the scenario of FIG. 2, NIC 22 transmits a request for an address onto network 100. DHCP server 40 receives request 42 and responds by assigning an IP address to the NIC 22, which is transmitted to the NIC 22 in response message 44.

The network boot code in NIC 22 is also configured with a boot server name corresponding to, in the example of FIG. 2, boot server 50. Boot server 50 stores and serves a boot file that will permit a target computer to boot-up in a pre-execution environment (PXE). NIC 22 transmits a request 52 for a boot file to boot server 50, which sends a response 54 to NIC 22 that contains a boot file. The boot file may, for example, be a small loader program or an intermediate Linux OS. NIC 22 loads the boot file from response message 52 into memory 24 in target computer 20 and initiates execution of the boot file.

The boot file in memory 24 is configured to perform an inventory to collect configuration data regarding the target computer 20. Examples of configuration or inventory data may include one or more of the target computer microprocessor, a manufacturer code, a manufacturer model, amount of memory, size of disk drive, and peripheral cards. The boot file may also be configured to solicit user input regarding the role of the target computer 20, e.g. workstation, server, etc., the role of the user, or a user identifier. Note that a system management BIOS (SMBIOS) may be needed in the target computer in order to obtain information regarding the machine's make, manufacturer, and unique identifier. Some or all of this inventory data is sent in a request 202 for an OS image sent from target computer 20 to OS management server 202. OS management server 200 uses some or all of the inventory data to search for a matching OS image in its storage. For example, OS management server 200 may search for a stored OS image having the same microprocessor type, clock speed, memory size and peripheral cards, e.g. a Pentium 4 with a 666 MHz. clock speed 1 Gbyte of RAM and a particular model of Ethernet card. By way of another example, server 200 may search for a stored OS image for the same manufacturer and model as the target computer, e.g. matching manufacturer identifier and model identifier. Note that a proxy server may be utilized to handle the function of downloading OS images for the OS management server 200 in order to accommodate high volume data transfer that may occur in some large-scale deployments. OS management server 200 may also utilize policy information from policy store 150, which may be provided by another server, in order to resolve the appropriate OS image for the target computer. Policy information may, for example, direct that a target computer having a particular role, e.g. server role, be provisioned with a predetermined OS image type, e.g. Linux. By way of another example, if the target computer is identified as having a workstation role then the appropriate OS image may be based, at least in part, upon that role, e.g. Windows XP.

If OS management server 200 finds a matching OS image for the target computer, then, in this example, the matching OS image is sent in a response 204 to the target computer 20. The PXE agent from the boot file in target computer 20 receives the OS image, loads it into disk storage 26 and initiates boot-up of the operating system from disk storage 26.

Figure 3:
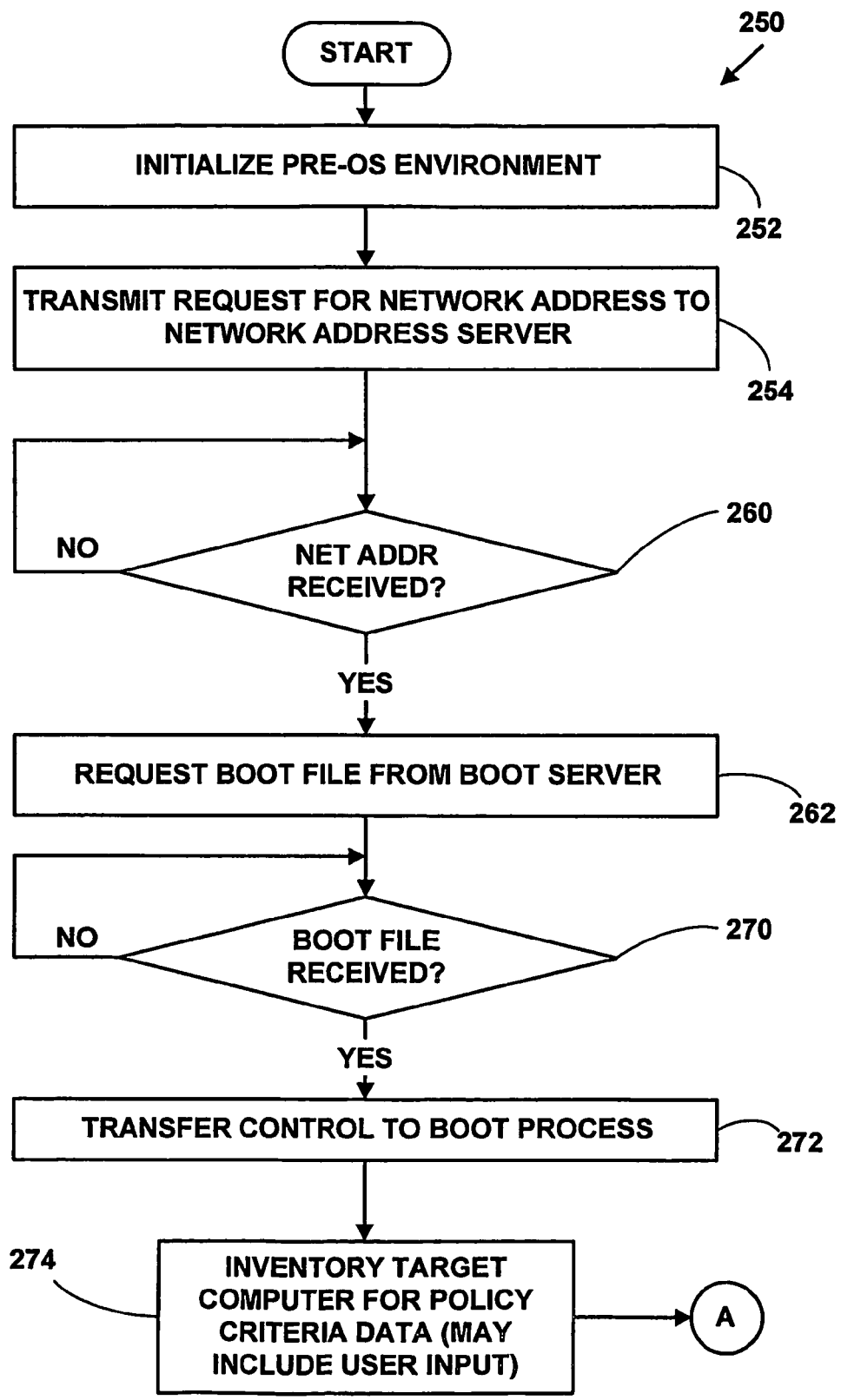
FIGS. 3 and 4 are control flow diagrams illustrating an exemplary embodiment of a process for provisioning an operating system in one of the target computers of FIGS. 1 and 2.

FIG. 3 is a control flow diagram illustrating an exemplary embodiment of a process performed in a target computer, such as those shown in FIGS. 1 and 2. At step 252, the target computer initializes in a pre-operating system (pre-OS) environment. For example, at power-up, the target computer may boot from firmware in a network interface card, from the computer's BIOS, or from media (e.g. locally or network attached, removable or permanent). Examples of pre-OS environments include Pre-boot Execution Environment (PXE), Remote Installation Services (RIS), and Virtual Boot Environment (VBE). See "OS Migration Best Practices," Powerquest, and "The When, What, Why, and How of Pre-OS," Argon Technology, and "Windows 2000 Professional Automated Deployment Options: An Introduction," Microsoft Corp., for more information and examples of Pre-OS environments. The Extended Firmware Interface (EFI) also provides an example of a pre-OS environment. See "PXE Manageability Technology for EFI," Mike Henry, Intel Developer Update Magazine, October 2000. In addition, some architectures may enable the client agent to reside in firmware on the target computer and boot from the firmware, such that it is unnecessary to download the boot file from the boot server. See the Compatibility Support Module (CSM) discussed in "BIOS Compatibility within the Intel Platform Innovation Framework for EFI", B. Richardson and R. Hale, Intel Developer Forum, Sept. 17, 2003.

The client agent that is initialized in the pre-OS environment on the target computer, in this embodiment, requests a network address, at step 254, from a network server, such as a DHCP server, and awaits a response containing a network address at step 260. In this embodiment, the client agent, at step 262, requests a boot file from a boot server and waits to receive the boot file at step 270. In one embodiment, the boot file can represent the entire boot process for the client agent. In another embodiment, such as a network boot, the boot process may execute on a server and the boot file contains a small number of files necessary for the target computer to communicate with the boot process on the server. For example, the boot file may be an intermediate Linux service OS that runs the client agent for discovering the policy criteria data on the target computer. At step 272, control is transferred to the boot process, e.g. by restarting to the Linux service OS.

Figure 4:
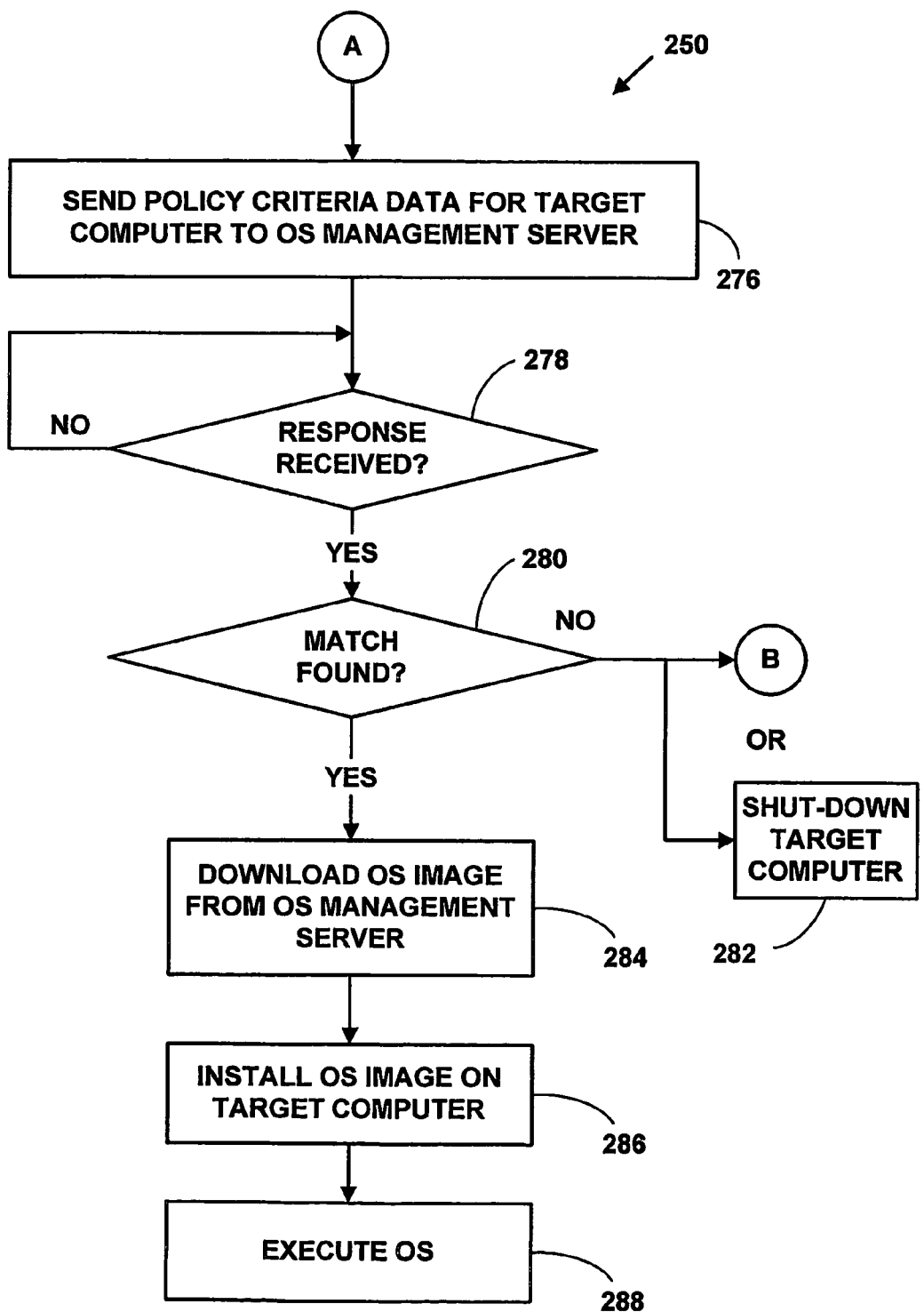

The boot process includes an inventory of the target computer for information about the target computer that determines which OS image is suitable for the target computer. This inventory takes place at step 274 where policy criteria data relating to configuration is collected. In one embodiment, the data collected includes user input, such as machine role (e.g. web server, application server, desktop/workstation, or mobile computer) or user identifier, which is solicited from a user by the client agent. Examples of policy criteria data includes network location (e.g. LAN segment), blade slot location, CPU type, RAM size, disk space, and electronically inscribed identification information (e.g. asset tag, MAC address or computer identification). Process 250 continues in FIG. 4, where, in this embodiment, the policy criteria data collected at the target computer is sent to the OS management server 200 of FIGS. 1 and 2 at step 276 and the target computer waits for a response for the OS management server at step 278.

If the response from the OS management server 200 indicates that no suitable OS image was found, then control flow branches at step 280. In one embodiment, control branches to step 282, where the target computer shuts down because an OS image is unavailable. Alternatively, control flow can branch to the install process illustrated in FIG. 8, discussed below, wherein the target computer constructs and installs an OS image.

If a suitable OS image does exist on OS management server 200, then control branches to step 284, where the OS image is downloaded from the OS management server 200. Downloading the OS image can take place in a number of ways. In one exemplary embodiment, OS management server 200 responds by sending the OS image to the target computer. In another exemplary embodiment, OS management server 200 responds with an OS image identifier, which the target computer uses to send a subsequent request. In yet another exemplary embodiment, an object structure may be sent to the target computer that allows it to identify objects for the OS image that can be individually requested. See U.S. Pat. Nos. 5,581,764 and 6,292,889, herein incorporated by reference in their entirety, for further details regarding such an object oriented approach. One of ordinary skill in the art will readily appreciate that a variety of approaches may be taken without departing from the teachings of the present invention.

Once the OS image is downloaded, it is installed, at step 286, on the target computer, such as by copying it onto a hard drive of the target computer, and, at step 288, control is transferred to the OS that has been installed. Note that it may be desirable to use Microsoft Sysprep to distribute Microsoft operating systems using cloned images, which generally requires the creation of a Sysprep.inf file that is delivered along with the OS image. When the OS image is delivered to the target computer, the Microsoft Mini-Setup Wizard runs using answers from the Sysprep.inf file in order to install the image. At this point, the target computer is operating with the OS image that has been provided from the OS management server 200.

Figure 5:
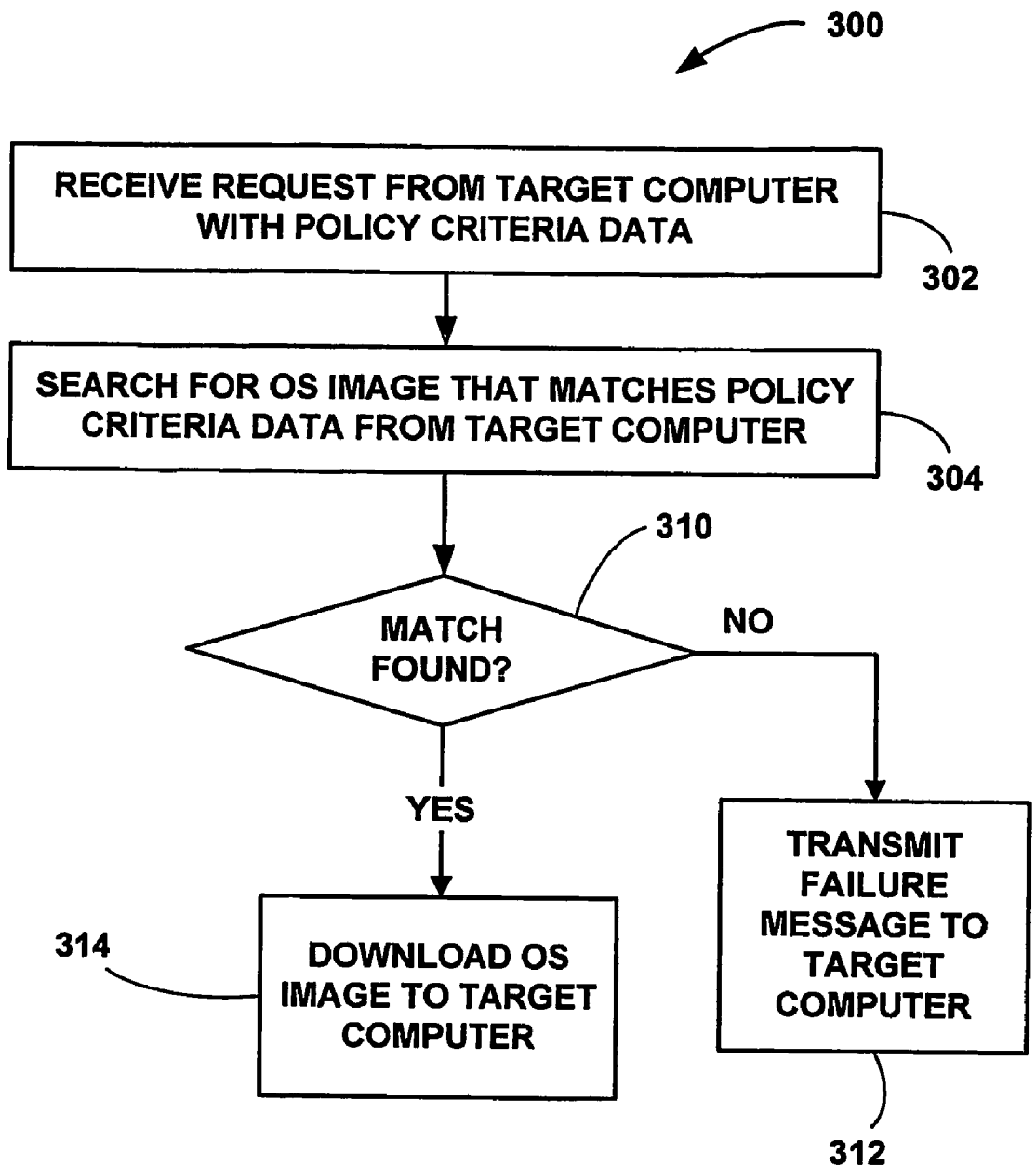
FIG. 5 is a control flow diagram illustrating an exemplary embodiment of a process in the operating system management server of FIGS. 1 and 2 for obtaining an operating system image for a target computer utilizing policy criteria data collected on the target computer.

FIG. 5 is a control flow diagram illustrating one exemplary embodiment of a process 300 taking place on OS management server 200. In process 300, at step 302, OS management server 200 receives the request from the target computer sent, for example, at step 276 in FIG. 4. This request includes policy criteria data from the target computer. In this embodiment, at step 304, OS management server 200 searches its databases or storage for an OS image that matches the policy criteria from the target device. For example, it may search for an OS image that was constructed for a computer having the same CPU model, clock speed and memory size. As another example, server 200 may search for an OS image constructed for the same manufacturer and model identifier. As still another example, server 200 may search for an OS image constructed for the same role as the target computer, e.g. a Linux server. As one of ordinary skill in the art will readily appreciate, the criteria used in this search may vary widely without departing from the teachings of the present invention. For example, it may not be necessary, in some applications, to use all of the policy criteria data collected from the target computer and as few as one policy criterion may be utilized. Note that it may be advantageous, in this embodiment, to store data, e.g. metadata, for each OS image that describes the characteristics, e.g. policy criteria data, for the target computer for which the OS image was constructed in order to facilitate this search.

If no matching OS image is found, then control flow branches at step 310 to step 312 where, in this embodiment, a failure message is transmitted to the target computer. In this case, processing in the target computer branches at step 280 of FIG. 4. Note that in one alternative embodiment, the target computer and OS management server may be configured such that a timeout in the target computer without a response from the OS management server 200 serves to indicate that no matching OS image was found.

However, if an OS image is found that has policy criteria data that match the data provided from the target computer and used in the search, then control branches to step 314, where the matching OS image is downloaded to the target device. This step may involve downloading the OS image itself or, alternatively, downloading an object identifier for the OS image that enables the target computer to request the OS image or its components from the OS management server 200 or another server adapted for serving the OS image file. In this case, processing proceeds in the target computer at step 284 of FIG. 4 whereby the OS image is installed and executed.

As noted above, an embodiment of a system may be configured to resolve a matching OS image through the use of policy information. For example, the OS management server 200 may be configured to utilize policy criteria data from the target computer, e.g. the target computer's, role or the manufacturer identifier, and combine it with policy data, e.g. from policy store 150 in FIG. 2, for the organization for which the system is utilized in order to identify a type of OS image defined for the target computer. For example, policy data from store 150 may indicate that all machines identified as having the role of web server should be provided with a Linux operating system. Similarly, all machines identified as having the role of workstation should be provided with a selected version of a Microsoft Windows operating system. Likewise, machines on a selected network segment, e.g. LAN segment, may be identified to receive a certain UNIX operating system version or perhaps a thin client operating system. For example, server farm environments are frequently divided by subnets, which may make this criterion useful. Also, a particular user may be defined to receive a certain type of operating system. More detailed examples of policy and object oriented based systems are illustrated in U.S. Pat. Nos. 5,581,764 and 6,292,889, herein incorporated by reference in their entirety.

Figure 6:
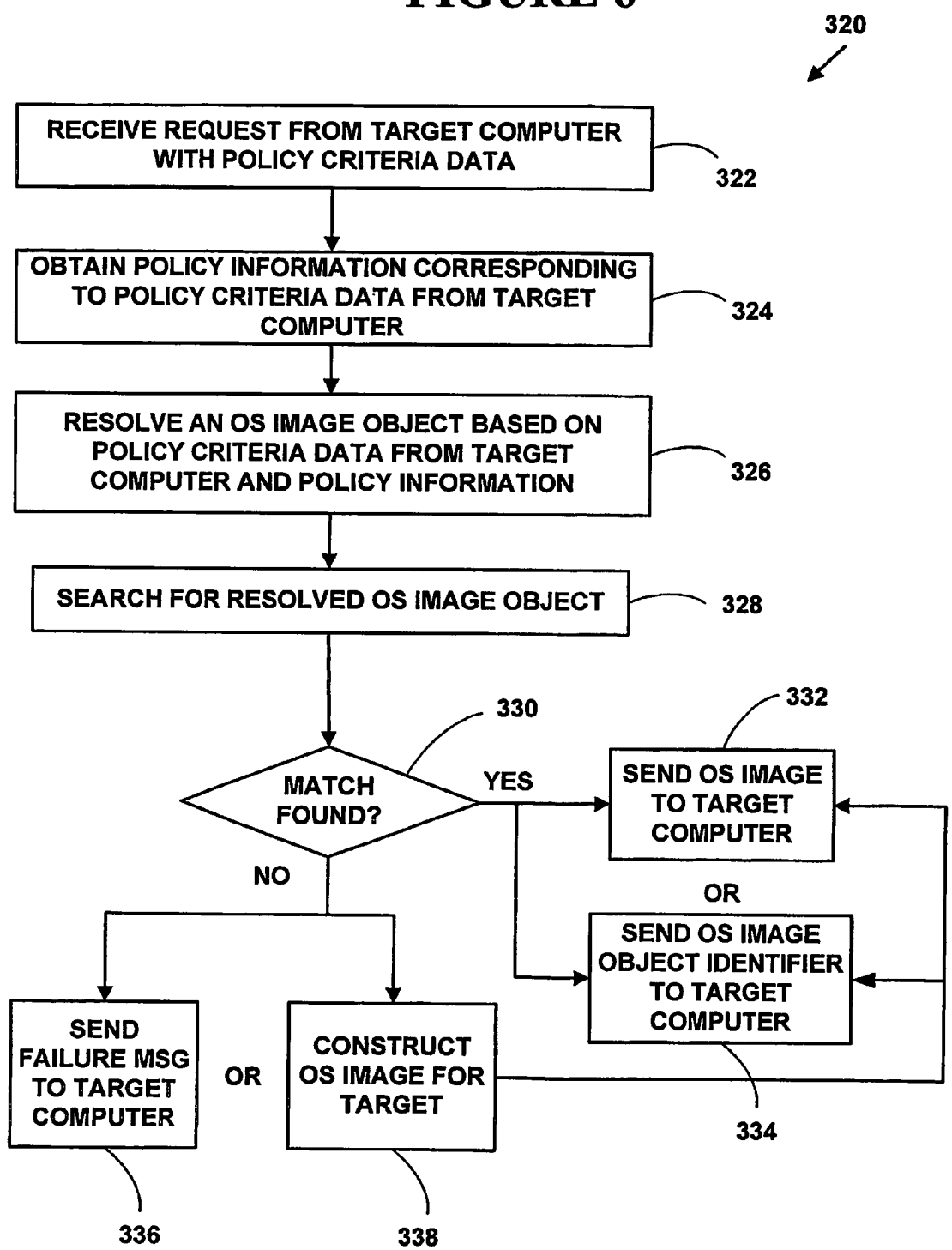
FIG. 6 is a control flow diagram illustrating another exemplary embodiment of a process in the operating system management server of FIGS. 1 and 2 for identifying a suitable operating system image for a target computer based on policy criteria data collected on the target computer and policy information.

FIG. 6 is a control flow diagram illustrating an exemplary embodiment of a process 320 in OS management server 200 that utilizes policy information to identify a suitable OS image for the target computer. At step 322, OS management server 200 receives the message sent from the target computer that includes policy criteria data collected at the target computer. At step 324, OS management server 200 obtains policy information for the resolution process from policy store 150. Note that policy store 150 may be part of OS management server 200 or the information may be obtained from another computer, e.g. a policy server. A policy store typically defines the logical relationships between data classes and the necessary policy instances, such as subnet or role, are created and connected to an OS service representing an OS image. For example, a particular OS image type may be assigned to a model, subnet, role or manufacturer.

At step 326, OS management server 200 resolves or identifies, an OS image based on the policy criteria data from the target computer and the policy information from policy store 150. In one embodiment, OS management server 200 resolves an OS image object identifier that specifies an OS image. The OS image object identifier that is the result of the resolution at step 326 is used at step 328 to search for the OS image object. In another embodiment, the resolution process at step 326 yields data describing the type of OS image that is suitable under the policy rules, e.g. a Linux OS, and this data is used at step 328 to search for a corresponding OS image.

If a suitable OS image is found at step 328, then, in one embodiment, control flow branches to step 332, where the OS image is sent to the target computer where it is processed as described above with respect to FIG. 4. In an alternative embodiment, control branches to step 334, where the OS image object identifier is sent to the target computer for processing as described below with respect to FIG. 7.

If no matching OS image is found, then, in one embodiment, control branches to step 336, where a failure message is sent to the target computer. In an alternative embodiment, control branches to step 338, where an OS image is constructed on the OS management server 200 for the target computer and either the OS image is sent to the target computer, e.g. step 332, or an OS image object identifier is sent to the target computer, e.g. step 338.

Figure 7:
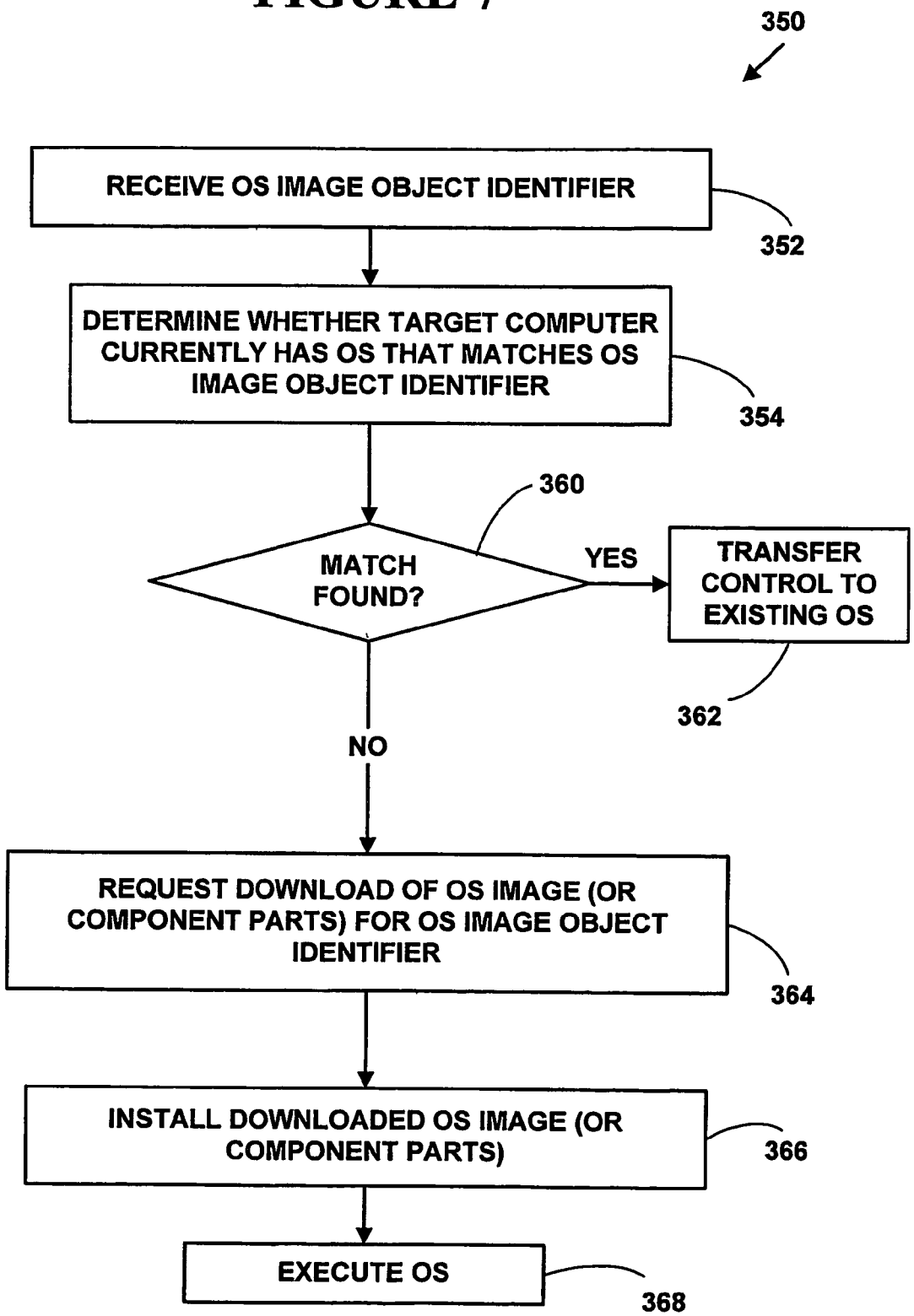
FIG. 7 is a control flow diagram illustrating another exemplary embodiment of a process in a target computer for identifying whether an existing operating system on the target computer is suitable for the target computer.

FIG. 7 is a control flow diagram illustrating an alternative embodiment of a process 350 in the target computer adapted to address a situation where an OS is pre-existing on the target computer. In this embodiment, at step 352, an OS image object identifier is received from OS management server 200, as described above with respect to certain alternative embodiments set forth in FIG. 6. At step 354, the target computer determines whether an OS that is already present on the target computer corresponds to the OS image object identifier received from OS management server 200. If the existing OS image matches the OS image object identifier provided at step 352, then control branches to step 362, where control is transferred to the existing OS on the target computer. This approach permits an existing OS on the target computer to be verified and unnecessary downloads from OS management server 200 may be avoided.

However, if the existing OS on the target computer does not correspond to the OS image object identifier provided at step 352, then control branches to step 364, where the target computer requests download from OS management server 200 of the OS image corresponding to the OS image object identifier. The new OS image is then installed, at step 366, and executed, at step 368, on the target computer. At this point, the target computer is operating with the new OS with which it has been provisioned.

Figure 8:
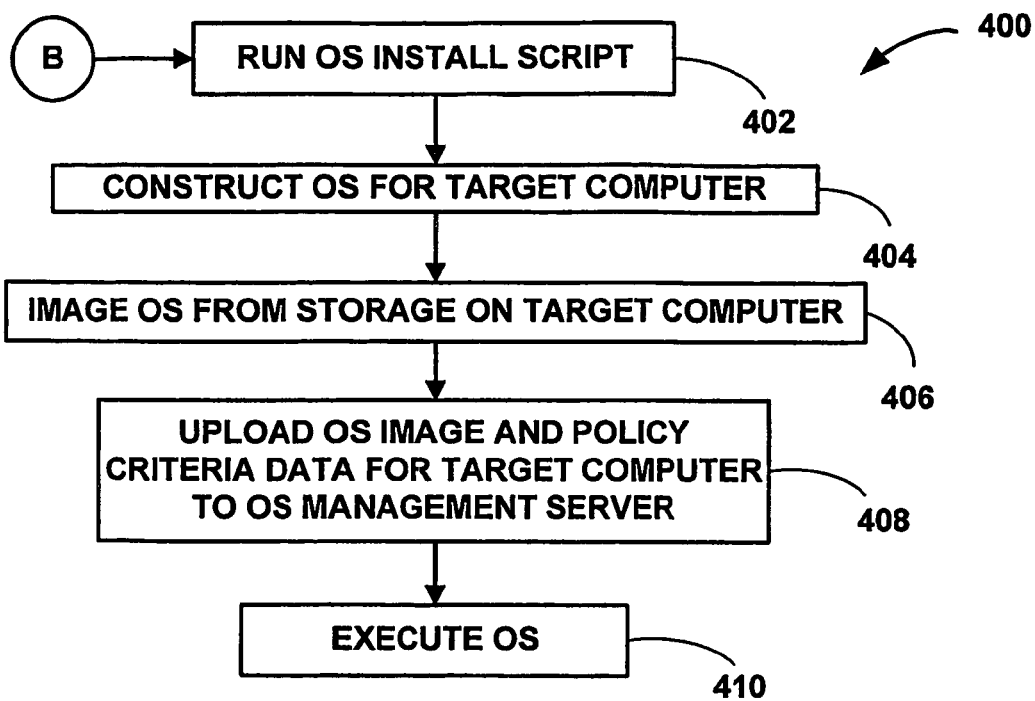
FIG. 8 is a control flow diagram illustrating an exemplary embodiment of a process in a target computer for constructing and imaging an operating system on the target computer.

FIG. 8 is a control flow diagram illustrating an alternative embodiment of a process 400 in the target computer whereby an OS may be constructed on the target computer, such as through attended or unattended install scripts, and the resulting OS imaged and sent to OS management server 200 for storage and use for devices similar to the target computer. At step 402, an OS install script is run to begin the installation process. For example, when the OS image is deployed to the target computer, the target machine reboots and the Windows Native Install setup installs the image. In an unattended setup, an Unattend.txt file provides the answers to the setup install. See "Windows 2000 Professional Deployment Options: An Introduction," Mar. 15, 2000, Microsoft Corp. and "OS Migration Best Practices," Powerquest.com for additional information on installation scripts. Note that if the install script is memory resident in its entirety, then the resulting OS can be imaged from long-term storage, e.g. a hard drive or disk, on the target computer without the code for the install script being included in the image. At step 404, the OS is constructed for the target computer. As noted above, the install script may be unattended or may involve user input. Once the OS is constructed, the device where the OS is installed is imaged and, at step 408, the image is uploaded to the OS management server along with policy criteria data from the target computer. Control is then passed to the newly constructed OS at step 410.

Figure 9:
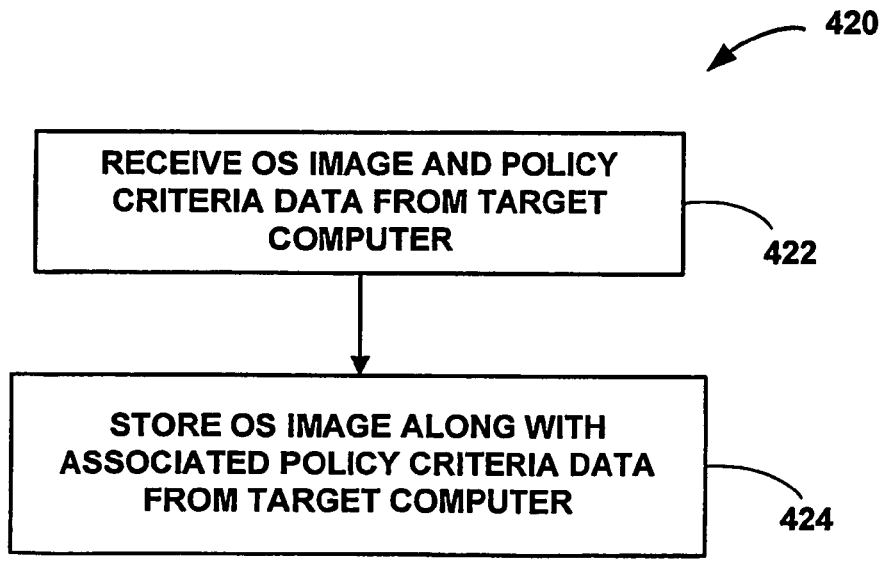
FIG. 9 is a control flow diagram illustrating an exemplary embodiment of a process in the operating system management server for storing the operating system image produced in the process of FIG. 8.

FIG. 9 is an embodiment of a process 420 in the OS management server for storing the image generated by the process of FIG. 8 on the target computer. At step 422, the OS management server receives the OS image and policy criteria data from the target computer. At step 424, the received OS image and associated policy criteria data from the target computer are stored so that it can be accessed in the future. Should another target computer with the same or similar policy criteria data later request an OS image from the OS management server, then the OS image constructed for the target computer in the process of FIG. 8 may be suitable for subsequent use by the other target computer. This stored OS image may then be downloaded to the other target computer.

Figure 10:
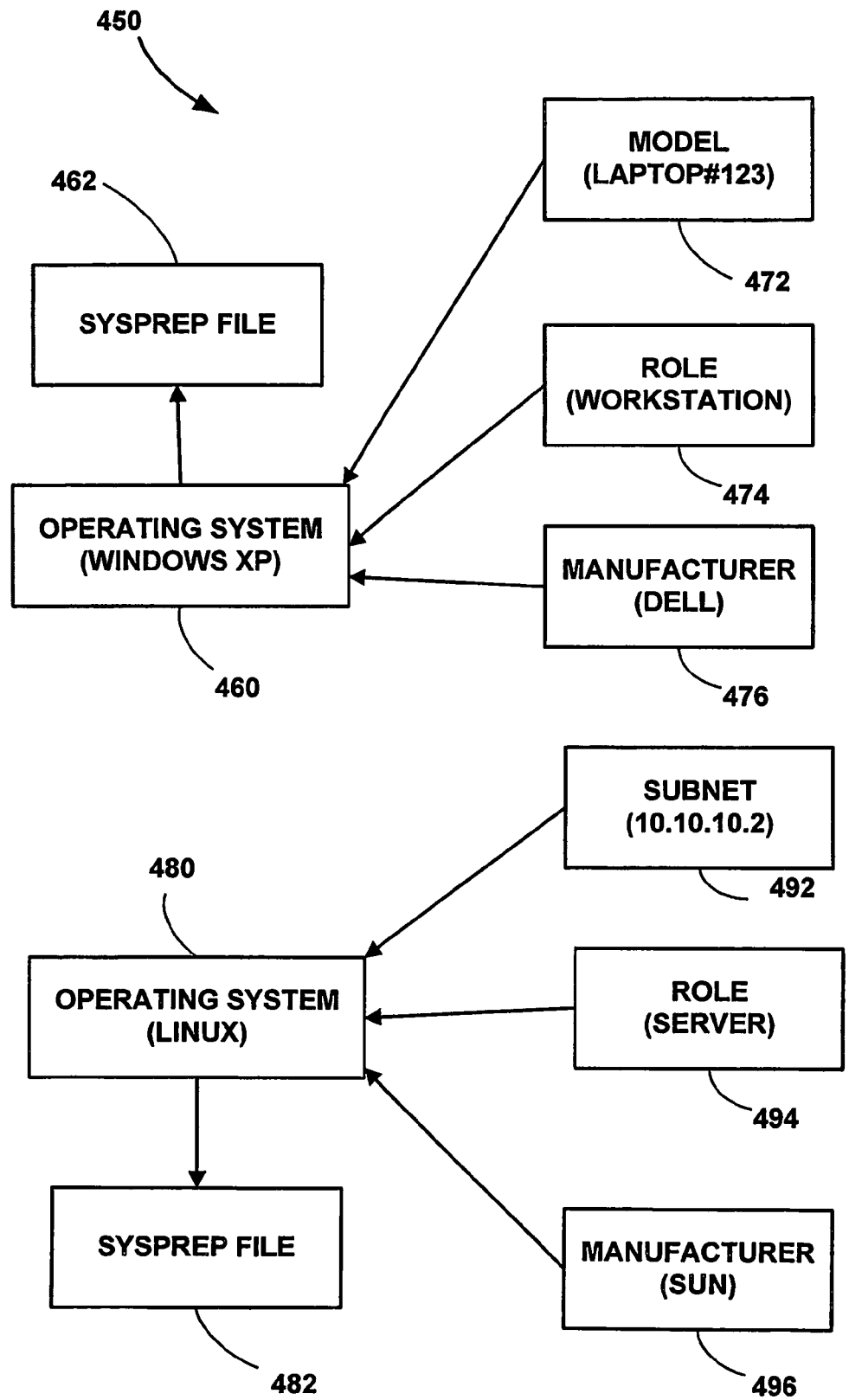
FIG. 10 is a logical relationship diagram illustrating an example of the relationships that may be defined in the policy store of FIGS. 1 and 2.

FIG. 10 is a logical diagram illustrating an example of the policy relationships 450 that may be defined in the policy store 150 of FIGS. 1 and 2 and which may be utilized to resolve an OS image for a target computer. The example of FIG. 10 illustrates machine policy instances 472, 474, 476, 492, 494, 496 connected to two different operating system policy instances 460 and 480. In this example, a model machine instance 472 for a particular model of laptop computer, e.g. LAPTOP#123, is connected to OS policy instance 460, which corresponds to Windows XP. Thus, in one example, when a target computer returns policy criteria data that indicates that the target computer is a model LAPTOP#123, the Windows XP operating system will be resolved for the target computer resulting in an OS image for Windows XP and Sysprep file 462 being sent to the target computer. Similarly, a target computer having policy criteria data indicating that it is a workstation, Workstation role instance 474, or having been manufactured by Dell, Dell manufacturer instance 476, will also resolve to the Windows XP OS image based on the relationships defined in the policy information 450.

Similarly, machine policy instances 492, 494 and 496 are connected to operating system instance 480, which corresponds to a Linux OS image. When a target computer provides policy criteria data that indicate that it is on a particular subnet, Subnet instance 492, has a server role, Role instance 494, or is manufactured by Sun, manufacturer instance 496, the connection of these machine instances to operating system instance 480 results in the Linux OS image along with Sysprep file 482 being downloaded to the target computer. Note that it may be desirable that the policy relationships be constructed such that no ambiguity in the operating system resolution occurs. This can be also be addressed by assigning a hierarchy to the machine instances, e.g. role, manufacturer, model, subnet. Also, in some embodiments discussed above, a OS image object identifier corresponding to the operating system instance may be provided to the target computer so that it can check to see if an existing OS matches the policy resolution or so the target computer can separately request download of the OS image file, e.g. from a proxy server.

Also note that the process for provisioning a target computer with an operating system can be adapted to generate a set of operating system images applicable to a target computer. An embodiment of a method for constructing a set of operating system images for a target computer involves the steps of booting the target computer in a pre-operating system environment, collecting configuration information for the target computer, and transmitting the configuration information to a predetermined server, such as the OS management server. However, it may be desirable to generate multiple OS images for the target computer. This embodiment, therefore, calls for searching a database in the server for a set of pre-existing operating system images corresponding to the configuration information from the target computer. For example, it may be desirable to provision a particular type of blade computer with a number of different OS images, e.g. Linux for servers, Windows XP for workstations. There may be a large number of this particular type of blade computer that will be deployed. In order to generate a library of suitable OS images for this type of target computer, it is useful to use one of this type of computer to generate a number of OS images for this type of computer. The deployment one particular OS image to a specific target computer may be resolved through policy information or through user input. In this embodiment, for each one of the operating system images in the set, if the operating system image is not found, then the embodiment calls for running an install script on the target computer to construct an operating system for the target computer, imaging the operating system constructed on the target computer, uploading the constructed operating system image from the target computer to the predetermined server, and storing the constructed operating system image and the configuration data in the database in the server. For example, this process may be run to produce multiple OS images that are then stored in the OS management server for use in later deployments of this type of target computer.

An operating environment for the devices of the operating system management system of the embodiments shown may include a processing system with one or more high speed Central Processing Unit(s) ("CPU"), processors and one or more memories. In accordance with the practices of persons skilled in the art of computer programming, the embodiments are described with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical signals by the CPU or processor. An electrical system represents data bits which cause a resulting transformation or reduction of the electrical signals, and the maintenance of data bits at memory locations in a memory system to thereby reconfigure or otherwise alter the CPU's or processor's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.

We claim:

1. A method for provisioning a target computer with an operating system, the method comprising the steps of:
   booting the target computer in a pre-operating system environment;
   collecting configuration information for the target computer prior to transmitting any operating system image to the target computer from a predetermined server, wherein the configuration information includes a blade slot location, a storage disk size, a network location identifier, a role identifier, and a user identifier;
   transmitting the configuration information to the predetermined server;
   searching a database in the server for a pre-existing operating system image corresponding to the configuration information from the target computer;
   if a corresponding operating system image is found, transferring the pre-existing operating system image to the target computer; and
   installing the pre-existing operating system image on the target computer.

2. The method of claim 1, the method further including the steps of:
   if no corresponding pre-existing operating system image is found, constructing an operating system image for the target computer using the configuration information;
   transferring the constructed operating system image to the target computer;
   installing the constructed operating system image on the target computer; and
   storing the constructed operating system image and the configuration data in the database in the server.

3. The method of claim 1, the method further including the steps of:
   if no corresponding pre-existing operating system image is found, running an install script on the target computer to construct an operating system for the target computer;
   imaging the operating system constructed on the target computer;
   uploading the constructed operating system image from the target computer to the predetermined server; and
   storing the constructed operating system image and the configuration data in the database in the server.

4. The method of claim 1, where the configuration information includes at least one of a microprocessor identifier, a memory size, a manufacturer identifier, a model identifier, a network interface card identifier, a bus identifier, electronically inscribed identification information, and a storage device identifier.

5. The method of claim 1, where the configuration information includes policy criteria data corresponding to the target computer.

6. A system for provisioning an operating system on target computers over a network, the system comprising:
   at least one target computer configured to respond to initialization by requesting a network address for communication over the network, respond to receiving the network address by requesting a boot file over the network, respond to receiving the boot file by executing the boot file in a pre-operating system environment to create a client agent, where the client agent is configured to perform an inventory of the target computer to collect configuration data and transmit the configuration data in a request for an operating system image to a predetermined server, wherein the client is configured to perform the inventory and to collect configuration data of the target computer prior to transmitting any operating system image to the target computer from the predetermined server and the configuration data includes a blade slot location, a storage disk size, a network location identifier, a role identifier, and a user identifier;
   the client agent being further configured to receive an operating system image and, responsive thereto, install the operating system image on the target computer and execute the operating system;
   a network address server configured to monitor the network for the request for a network address and, responsive thereto, allocate the network address for communication over the network and return it to the requesting device;
   a boot server configured to monitor the network for the request for the boot file and, responsive thereto, transmit the boot file to the requester; and
   an operating system management server configured to monitor the network for the request for an operating system image, receive the request along with the configuration data, use the configuration data to search for a corresponding operating system image and, if the corresponding operating system image is found, transmit the corresponding operating system image to the target computer.

7. The system of claim 6, where:
   the operating system management server is further configured to transmit a failure message to the target computer when no corresponding operating system image is found;
   the client agent on the target computer is further configured to receive the failure message and, responsive thereto, execute an install script on the target computer to construct an operating system, image the operating system, and upload the operating system image to the operating system management server; and the operating system management server is still further configured to receive the operating system image constructed on the target computer and store it along with the configuration data for the target computer.

8. The system of claim 6, where the operating system management server is further configured, when no corresponding operating system image is found, to construct an operating system image based on the configuration data from the target computer and transmit the constructed operating system image to the target computer.

9. The system of claim 6, where the client agent on the target computer is further configured to collect user input for inclusion in the configuration data.

10. The method of claim 6, where the configuration data includes at least one of a microprocessor identifier, a memory size, a manufacturer identifier, a model identifier, a network interface card identifier, a bus identifier, electronically inscribed identification information, and a storage device identifier.

11. The method of claim 6, where the configuration information includes policy criteria data corresponding to the target computer.

12. A method for determining an operating system for target computers over a network the method comprising the steps of:

booting a target computer in a pre-operating system environment;

collecting policy criteria data for the target computer prior to transmitting any operating system image to the target computer from an operating system management server, wherein the policy criteria data includes a blade slot location, a storage disk size, a network location identifier, a role identifier, and a user identifier;

transmitting the policy criteria data to the operating system management server;

providing policy data defining a relationship between specific policy criteria data instances and operating system image instances;

resolving an appropriate operating system image for the target computer based on the policy criteria data from the target computer and the policy information; and transmitting to the target computer an operating system object identifier corresponding to the resolved operating system image.

13. The method of claim 12, the method further comprising the steps of:

receiving the operating system object identifier corresponding to the resolved operating system image in the target computer;

requesting download of the operating system image file corresponding to the operating system object identifier; and installing the operating system image and executing the operating system responsive to receiving the operating system image file in the target computer.

14. The method of claim 12, the method further comprising the steps of:

receiving the operating system object identifier corresponding to the resolved operating system image in the target computer;

checking whether the operating system object identifier corresponds to an operating system currently installed on the target computer;

if the operating system object identifier does not correspond to the operating system currently installed on the target computer, requesting download of the operating system image file corresponding to the operating system object identifier, receiving the operating system image file in the target computer, installing the operating system image, and executing the operating system; and if the operating system object identifier does correspond to the operating system currently installed on the target computer, executing the operating system currently installed on the target computer.

15. The method of claim 12, where the policy criteria data includes at least one of a microprocessor identifier, a memory size, a manufacturer identifier, a model identifier, a network interface card identifier, a bus identifier, electronically inscribed identification information, and a storage device identifier.

16. A system for installing an operating system on a target computer using a network, the system comprising:

means for collecting configuration information for the target computer in a pre-operating system environment, wherein the configuration information for the target computer is collected prior to transmitting any operating system image to the target computer from a predetermined server and the configuration information includes a blade slot location, a storage disk size, a network location identifier, a role identifier, and a user identifier;

means for requesting download of an operating system image that corresponds to the configuration information for the target computer;

means for identifying an operating system image that corresponds to the configuration information from the target computer;

means for downloading an operating system image that corresponds to the configuration information from the target computer if the corresponding operating system image is found; and means for installing and executing the corresponding operating system image on the target computer.

17. A method for constructing a set of operating system images for a target computer, the method comprising the steps of:

booting the target computer in a pre-operating system environment;

collecting configuration information for the target computer prior to transmitting any operating system image to the target computer from a predetermined server, wherein the configuration information includes a blade slot location, a storage disk size, a network location identifier, a role identifier, and a user identifier;

transmitting the configuration information to the predetermined server;

searching a database in the server for a set of pre-existing operating system images corresponding to the configuration information from the target computer;

for each one of the operating system images in the set, if the operating system image is not found, then running an install script on the target computer to construct an operating system for the target computer, imaging the operating system constructed on the target computer, uploading the constructed operating system image from the target computer to the predetermined server, and storing the constructed operating system image and the configuration data in the database in the server.

* * * * *